United States Patent
Iwasaki et al.

(10) Patent No.: US 7,414,950 B2
(45) Date of Patent: Aug. 19, 2008

(54) ABERRATION CORRECTION LIQUID CRYSTAL DEVICE AND OPTICAL PICKUP APPARATUS

(75) Inventors: Masayuki Iwasaki, Saitama (JP); Makoto Sato, Saitama (JP)

(73) Assignee: Pioneer Corporation, Tokyo (JP)

( * ) Notice: Subject to any disclaimer, the term of this patent is extended or adjusted under 35 U.S.C. 154(b) by 465 days.

(21) Appl. No.: 10/729,969

(22) Filed: Dec. 9, 2003

(65) Prior Publication Data

US 2004/0125734 A1 Jul. 1, 2004

(30) Foreign Application Priority Data

Dec. 11, 2002 (JP) .......................... P2002-358914

(51) Int. Cl.
*G11B 7/00* (2006.01)
(52) U.S. Cl. .................. 369/112.02; 369/53.22; 369/53.2
(58) Field of Classification Search ............ 369/112.02, 369/53.22

See application file for complete search history.

(56) References Cited

U.S. PATENT DOCUMENTS

2002/0085465 A1* 7/2002 Kobayashi ................ 369/53.2
2002/0085467 A1* 7/2002 Noborimoto et al. ..... 369/53.22

FOREIGN PATENT DOCUMENTS

| JP | 09-128785 | 5/1997 |
|---|---|---|
| JP | 10-020263 | 1/1998 |
| JP | 10-269611 | 10/1998 |
| JP | 11-110802 | 4/1999 |
| JP | 2004-127473 | 4/2004 |
| JP | 2004-178773 | 6/2004 |

* cited by examiner

*Primary Examiner*—Wayne Young
*Assistant Examiner*—Adam R. Giesy
(74) *Attorney, Agent, or Firm*—Drinker Biddle & Reath LLP

(57) ABSTRACT

In an optical pickup apparatus which includes at least a laser light source and an object lens and can apply a laser beam to different types of optical discs, an aberration correction liquid crystal device is placed on the optical axis of the laser beam emitted from the laser light source. The aberration correction liquid crystal device includes a first electrode section being placed on the side of the laser light source and having a first electrode pattern for correcting aberration concerning a first optical disc, a second electrode section being placed on the side of the optical disc and having a second electrode pattern for correcting aberration concerning a second optical disc different from the first optical disc in type, and liquid crystal being sandwiched between the first and second electrode sections.

10 Claims, 9 Drawing Sheets

ABERRATION CORRECTION LIQUID CRYSTAL DEVICE AND OPTICAL PICKUP APPARATUS

The present disclosure relates to the subject matter contained in Japanese Patent Application No. 2002-358914 filed on Dec. 11, 2002, which is incorporated herein by reference in its entirety.

BACKGROUND OF THE INVENTION

1. Field of the Invention

The present invention relates to an aberration correction liquid crystal device and an optical pickup apparatus.

2. Description of the Related Art

Optical discs such as a CD and a DVD from and onto which data is read and written using a laser beam become widely available in general. The optical disc is formed with small indentations called pits on a disc-like substrate for recording digital bit information. The pits are coated with a reflection layer of metal and a transparent, permeable protection layer, the reflection and protection layers being deposited on each other.

A new standard called Blu-ray Disc (BRD) higher in recording density than a DVD is also proposed. In the BRD, a violet laser having a wavelength of 405 nanometers is used to write a signal onto a record track of about a half of that of the DVD (0.32 microns). The BRD makes it possible to write 27-GB data onto a 12-cm single-layer disc and attention is focused on the BRD as the next-generation digital high-definition recording standard.

To read information from an optical disc, an optical pickup apparatus is used. In the optical pickup apparatus, a laser beam emitted from a laser light source is converged on the optical disc through an object lens and reflected light on the optical disc is received and is converted into an electric signal and information written into each pit is read.

In the optical disc pickup, generally a plurality of aberrations occur. There are disclosed relating arts to correct two different aberrations, in JP-A-11-110802 (See pages 5-13; and FIGS. 1-14) and in JP-A-10-269611 (See pages 3-5, FIGS. 1-5).

The document JP-A-11-110802 discloses aberration correction means for correcting comatic aberration occurring due to a tilt of an optical disc, particularly comatic aberrations about two directions of radial direction and tangential direction. The aberration correction means described in JP-A-11-110802 has segment electrodes and common electrodes formed with electrode patterns for correcting aberrations in the different directions.

In JP-A-11-110802, comatic aberrations in the radial direction and the tangential direction always simultaneously occur at the disc recording/playing back time and thus it is necessary to apply voltage to both electrodes for correcting the comatic aberrations in the radial direction and the tangential direction at the same time.

In correcting the aberration, both plus and minus directions exist as the correction direction. For example, to correct tilt of a disc, voltages are applied to electrodes on both sides of the reference electrode depending on the disc tilt direction. That is, the potential of each electrode needs to be made higher or lower than the potential of the reference electrode depending on the disc tilt direction. Taking the electrode configuration shown in FIG. 4 as an example, 3 V and 1 V may be applied to electrode 2 and electrode 3 respectively or 1 V and 3 V may be applied to electrode 2 and electrode 3 respectively with electrode 1 as the center (for example, fixed to 2 V) depending on the disc tilt direction; it is necessary to turn the voltages applied the electrodes 2 and 3 depending on the disc tilt direction. To do this, a circuit for applying voltages in response to the two cases mentioned above becomes necessary.

The document JP-A-10-269611 discloses wave front aberration correction means for correcting wave front aberration (spherical aberration) occurring depending on the thickness (distance) difference between the layers of a multilayer disc. The aberration correction means described in patent document 2 has segment electrodes and common electrodes formed with electrode patterns for correcting aberrations in different directions.

To correct the spherical aberration occurring due to the disc thickness difference, the disc thickness may be larger or smaller than the reference thickness value and to correct the aberration, the remaining electrode potentials relative to the reference electrode potential need to be turned in response to the thickness variation direction. For example, in the electrode configuration in FIG. 4, reference voltage 2 V and 4 V and 1 V may be applied to electrode 2 and electrode 3 and electrode 1 respectively or reference voltage 2 V and 1 V and 4 V may be applied to electrode 2 and electrode 3 and electrode 1 respectively; it is necessary to make the voltages applied to the electrodes 3 and 1 need to be made higher and lower than the voltage applied to the electrode 2 depending on which direction the disc thickness varies from the reference value in. To do this, a circuit for applying voltages in response to the two cases mentioned above becomes necessary.

As described above, according to the related arts disclosed in JP-A-11-110802 and JP-A-10-269611, the segment and common electrodes are provided with the different patterns of electrodes, thereby simultaneously correcting different aberrations occurring at the optical disc recording/playing back time. Thus, voltages must be applied to both segment and common electrodes for correcting both aberrations at the same time.

Since the aberration caused to occur in a liquid crystal device (phase difference) is determined by the voltage difference between segment and common electrodes, it is desirable that one electrode potential should be set to 0 V to provide a larger phase difference. However, to drive both electrodes at the same time, it is virtually impossible to set one electrode to 0 V.

Both plus and minus directions exist as the aberration correction direction and thus any other electrode potential than the reference electrode potential needs to be made higher or lower than the reference electrode potential.

SUMMARY OF THE INVENTION

The invention was made in view of such a conventional circumference and an object of the invention is to solve a problem of the requirement for applying voltages to both segment and common electrodes for correcting both aberrations at the same time. Another object of the invention is to solve a problem of the need for making the electrode potential higher or lower than the reference electrode potential. Further another object of the invention is to solve a problem of the impossibility of setting one electrode to 0 V.

In order to achieve the objects, according to a first aspect of the invention, there is provided an aberration correction liquid crystal device to be mounted in an optical pickup apparatus for applying a laser beam emitted from a laser light source onto different types of optical discs, and to be disposed on an optical axis of the laser beam, the device including: a first electrode section to be placed on the side of the laser light source and having a first electrode pattern for correcting aberration concerning a first optical disc; a second electrode section to be placed on the side of the optical disc and having a second electrode pattern for correcting aberration concerning a second optical disc different from the first optical disc in type; and a liquid crystal being sandwiched between the first and the second electrode sections.

According to a second aspect of the invention, there is provided an optical pickup apparatus that read or write information from or onto different types of optical discs, the optical pickup apparatus including: a laser light source configured to emit a laser beam; an object lens configured to converge the laser beam on an optical disc; and an aberration correction liquid crystal device configured to be disposed between the laser light source and the object lens, and on an optical axis of the laser beam, wherein the aberration correction liquid crystal device includes: a first electrode section to be placed on the side of the laser light source and having a first electrode pattern for correcting aberration concerning a first optical disc; a second electrode section to be placed on the side of the optical disc and having a second electrode pattern for correcting aberration concerning a second optical disc different from the first optical disc in type; and a liquid crystal being sandwiched between the first and the second electrode sections.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

Referring now to the accompanying drawings, there are shown preferred embodiments of the invention.

First Embodiment

A first embodiment of an optical pickup apparatus 1 according to the invention will be discussed hereinbelow.

Figure 1:
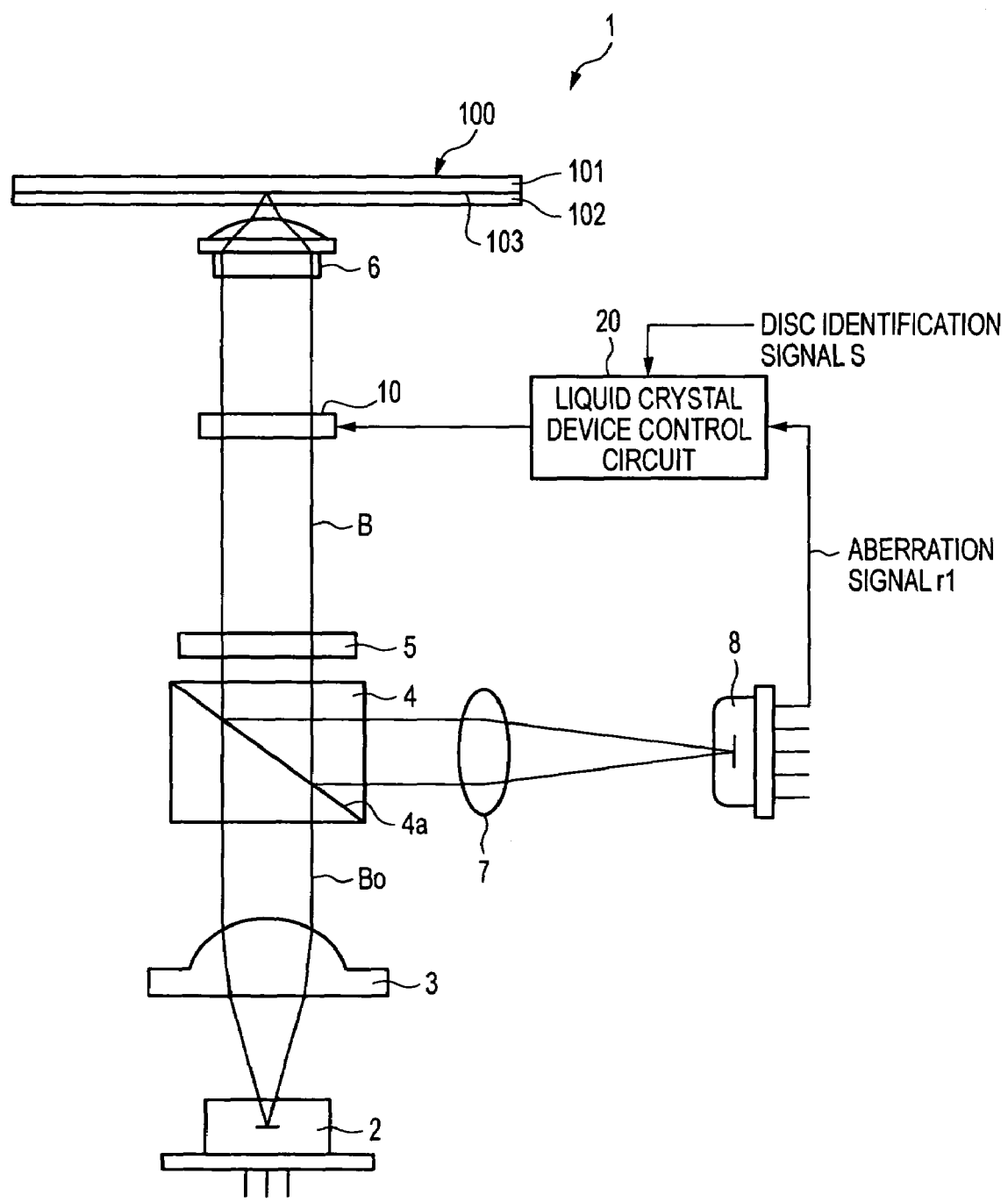
FIG. 1 is a drawing to show the optical layout of an optical pickup apparatus according to a first embodiment of the invention.

FIG. 1 is a drawing to show the optical layout of the optical pickup apparatus 1 according to the first embodiment. The optical pickup apparatus 1 is an optical pickup of DVD-BRD compatible type capable of recording and playing back both DVD and BRD standard discs. The optical pickup apparatus 1 is an apparatus for applying a laser beam onto an optical disc 100 of a DVD or a BRD and receiving reflected light, thereby reading information recorded on a signal record face 103 of the optical disc 100. The optical pickup apparatus 1 includes a laser light source 2, a collimator lens 3, a polarization beam splitter 4, a quarter wavelength plate 5, an object lens 6, a focus lens 7, a light receiver 8, and an aberration correction liquid crystal device 10.

The laser light source 2 is a semiconductor laser light source for emitting a laser beam Bo of a predetermined wavelength having a polarization plane P. The laser light source 2 has a DVD semiconductor laser light source for emitting a laser beam of a wavelength of 650 nm for a DVD and a BRD semiconductor laser light source for emitting a laser beam of a wavelength of 405 nm for a BRD. The laser beam Bo emitted from the laser light source 2 is sent to the collimator lens 3.

The collimator lens 3 is a lens for converting the laser beam Bo emitted from the laser light source 2 into parallel light. When all optical paths of laser light emitted from the laser light source 2 are almost parallel with the optical axis, the light is referred to as the parallel light. The parallel light provided by the collimator lens 3 is sent to the polarization beam splitter 4.

The polarization beam splitter 4 is a device for allowing the laser beam Bo to pass through as a laser beam B of linearly polarized light having a polarization plane P and reflecting a laser beam whose polarization plane P is rotated 90°, reflected on the optical disc 100 and incident from the optical disc 100 side. The laser beam B passed through the polarization beam splitter 4 in a straight line is sent to the quarter wavelength plate 5. The laser beam B incident from the optical disc 100 side and reflected on the polarization beam splitter 4 is bent 90° in the travel direction and then is sent to the focus lens 7.

The quarter wavelength plate 5 is a device for rotating the electric field component of the incident laser beam and converting linearly polarized light into circularly polarized light and circularly polarized light into linearly polarized light. The laser beam B of linearly polarized light incident on the quarter wavelength plate 5 from the polarization beam splitter 4 is converted into circularly polarized light through the quarter wavelength plate 5 and is sent to the object lens 6. The laser beam B of circularly polarized light reflected on the optical disc 100 and again incident on the quarter wavelength plate 5 is converted into linearly polarized light through the quarter wavelength plate 5 and is again incident on the polarization beam splitter 4. The laser beam B twice passed through the quarter wavelength plate 5 has the polarization plane P rotated 90°.

The object lens 6 converges the laser beam B sent from the quarter wavelength plate 5 on the signal record face 103 formed in the optical disc 100. The object lens 6 also converts the laser beam B reflected on the optical disc 100 into parallel light and sends it to the quarter wavelength plate 5. The optical disc 100 has a substrate 101 and has the signal record face 103 formed on a single side or both sides of the substrate 101. The signal record face 103 is covered with a translucent transparent protection layer 102 for protecting the signal record face 103.

The focus lens 7 is placed between the polarization beam splitter 4 and the light receiver 8. The focus lens 7 converges the laser beam B provided by the polarization beam splitter 4 on the light receiver 8.

The light receiver 8 receives the laser beam B, converts the laser beam B into an electric signal, and reads information. The light receiver 8 also reads an aberration pattern responsive to the light reception pattern of the received laser beam and outputs an aberration signal r1 responsive to the aberration pattern to a liquid crystal device control circuit 20.

Figure 2:
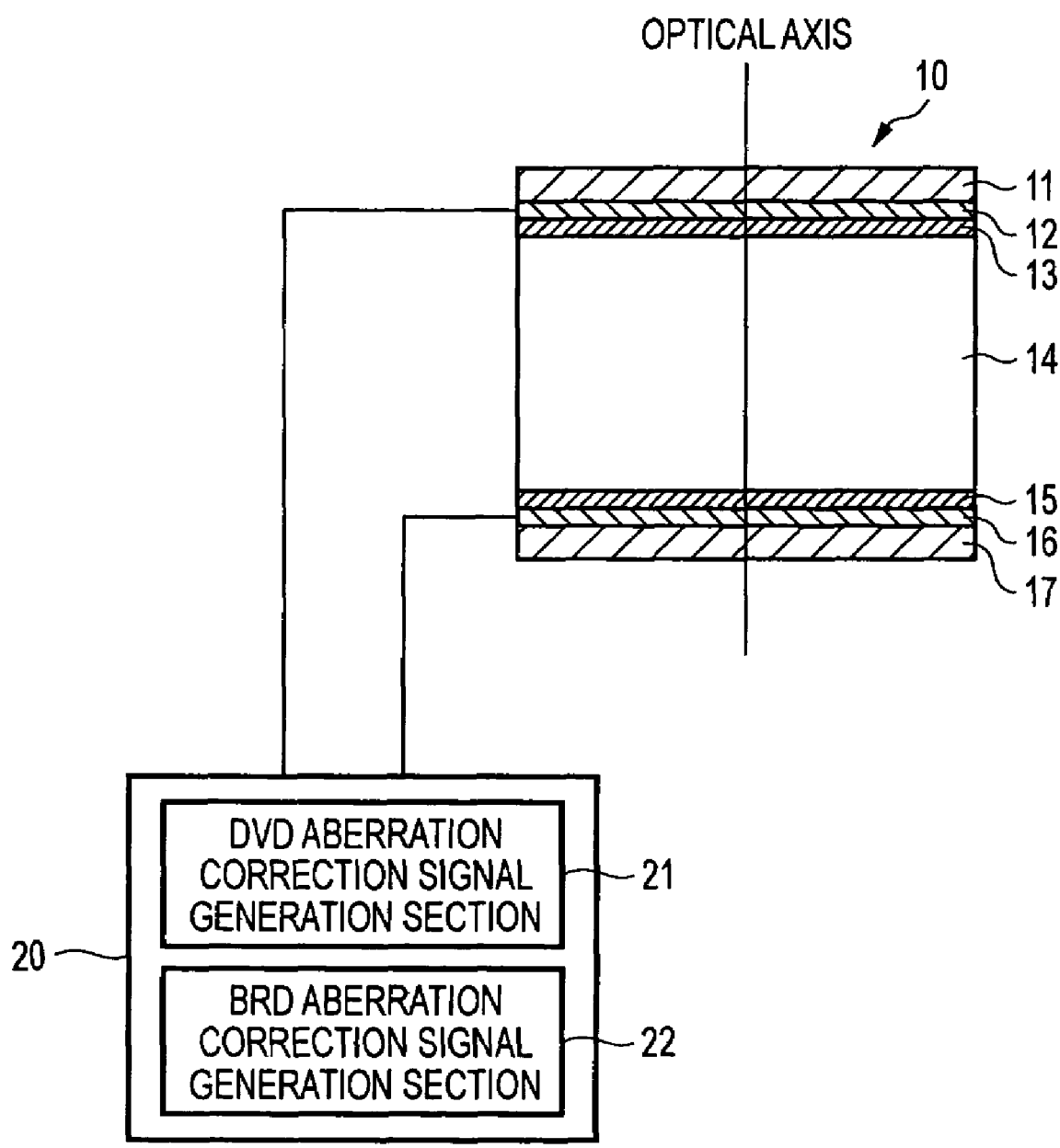
FIG. 2 is a sectional view to show an aberration correction liquid crystal device.

FIG. 2 is a sectional view to show the aberration correction liquid crystal device 10. The aberration correction liquid crystal device 10 is placed on the optical axis between the quarter wavelength plate 5 and the object lens 6. The DVD and BRD differ in the distance from the disc surface to the signal record face 103, namely, the thickness of the transparent protection layer 102, and spherical aberration depending on the thickness difference occurs. Variations in the thicknesses of manufactured discs exist and also cause spherical aberration to occur. The aberration correction liquid crystal device 10 is provided for correcting the aberration occurring depending on the DVD and BRD. The aberration correction liquid crystal device 10 is made up of liquid crystal 14, orientation films 13 and 15, a first electrode section 12, a second electrode section 16, a first substrate 11, and a second substrate 17.

The liquid crystal 14 is a device wherein the orientation of liquid crystal molecules changes as voltage is applied across the liquid crystal and the refractive index changes accordingly. As the refractive index changes, the liquid crystal 14 changes the optical path difference of laser light passed through the liquid crystal for generating aberration (phase difference) corresponding to the optical path difference change.

The orientation films 13 and 15 are provided for giving predetermined molecular orientation to the liquid crystal 14 and are placed so as to sandwich the liquid crystal 14 therebetween. The first electrode section 12 and the second electrode section 16 are placed on the surfaces of the orientation films 13 and 15. The first electrode section 12 and the second electrode section 16 are translucent transparent electrodes formed of material such as ITO. Each electrode section is formed with a predetermined electrode pattern and is electrically connected to the external liquid crystal device control circuit 20 for applying a voltage across the liquid crystal 14. The first electrode section 12 and the second electrode section 16 are formed and held on the substrates 11 and 17.

Figure 3:
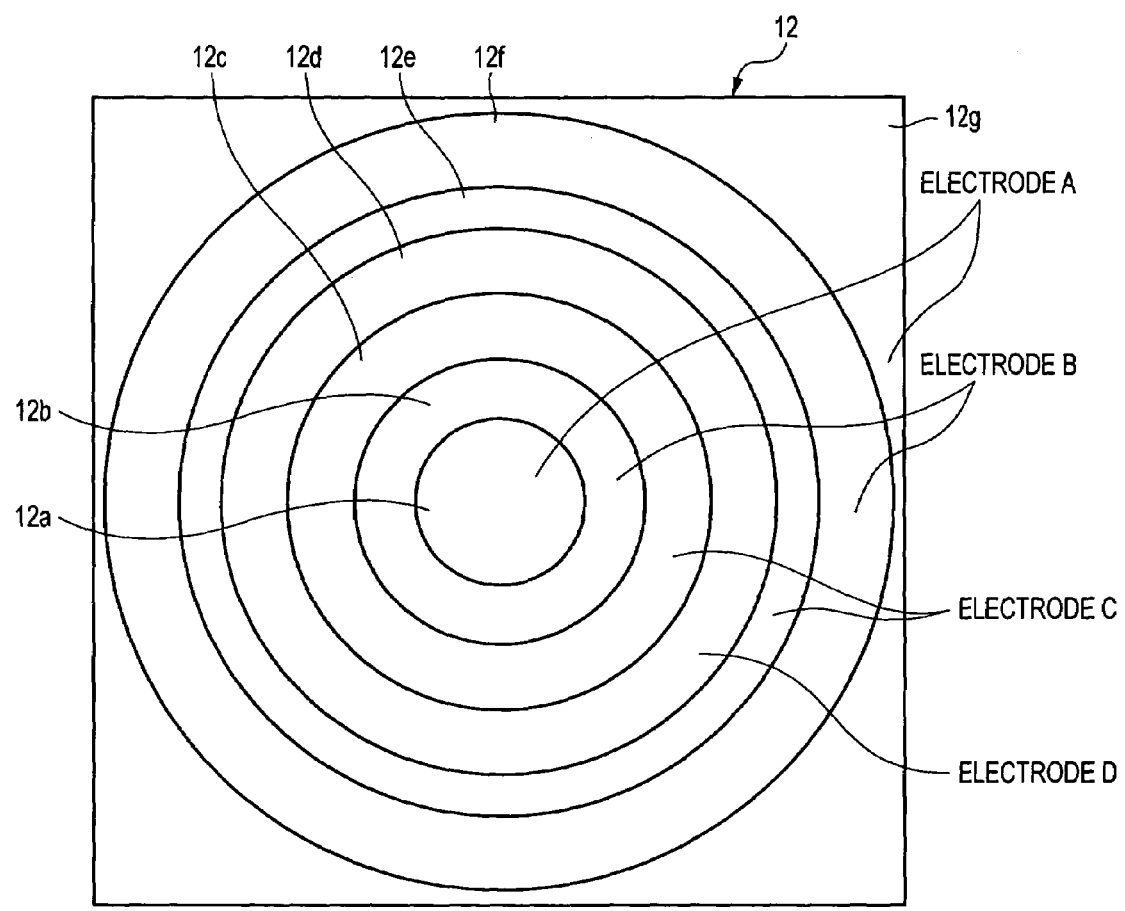
FIG. 3 is a plan view to show a first electrode section of the optical pickup apparatus according to the first embodiment of the invention.

FIG. 3 is a plan view to show the first electrode section 12. The first electrode section 12 is formed with an electrode pattern for correcting spherical aberration occurring on the optical disc of BRD. The first electrode section 12 is made up of areas divided concentrically. In FIG. 3, a center circular area 12a and an outermost area 12g are placed in the same potential, forming an electrode A; an area 12b on the outer peripheral side of the circular area 12a and an area 12f on the inner peripheral side of the outermost area 12g are placed in the same potential, forming an electrode B; an area 12c on the outer peripheral side of the area 12b and an area 12e on the inner peripheral side of the area 12f are placed in the same potential, forming an electrode C; and an area 12d sandwiched between the areas 12c and 12e is placed in the same potential, forming an electrode D. In the first electrode section 12, the adjacent areas are insulated from each other.

The area of the first electrode section 12 is divided in response to the pattern of spherical aberration occurring on the BRD. Specifically, the pattern of spherical aberration occurring on the BRD is previously calculated using optical path tracking in an optimized optical system. The first electrode section 12 is divided corresponding to the pattern of spherical aberration based on the result of the optical path tracking, and voltage is applied to each electrode of the first electrode section 12 so as to give a phase difference opposite to the calculated spherical aberration. The given phase difference and the spherical aberration occurring on the BRD cancel each other out. Thus, the first electrode section 12 corrects the detected signal so as not to cause spherical aberration to occur.

Figure 4:
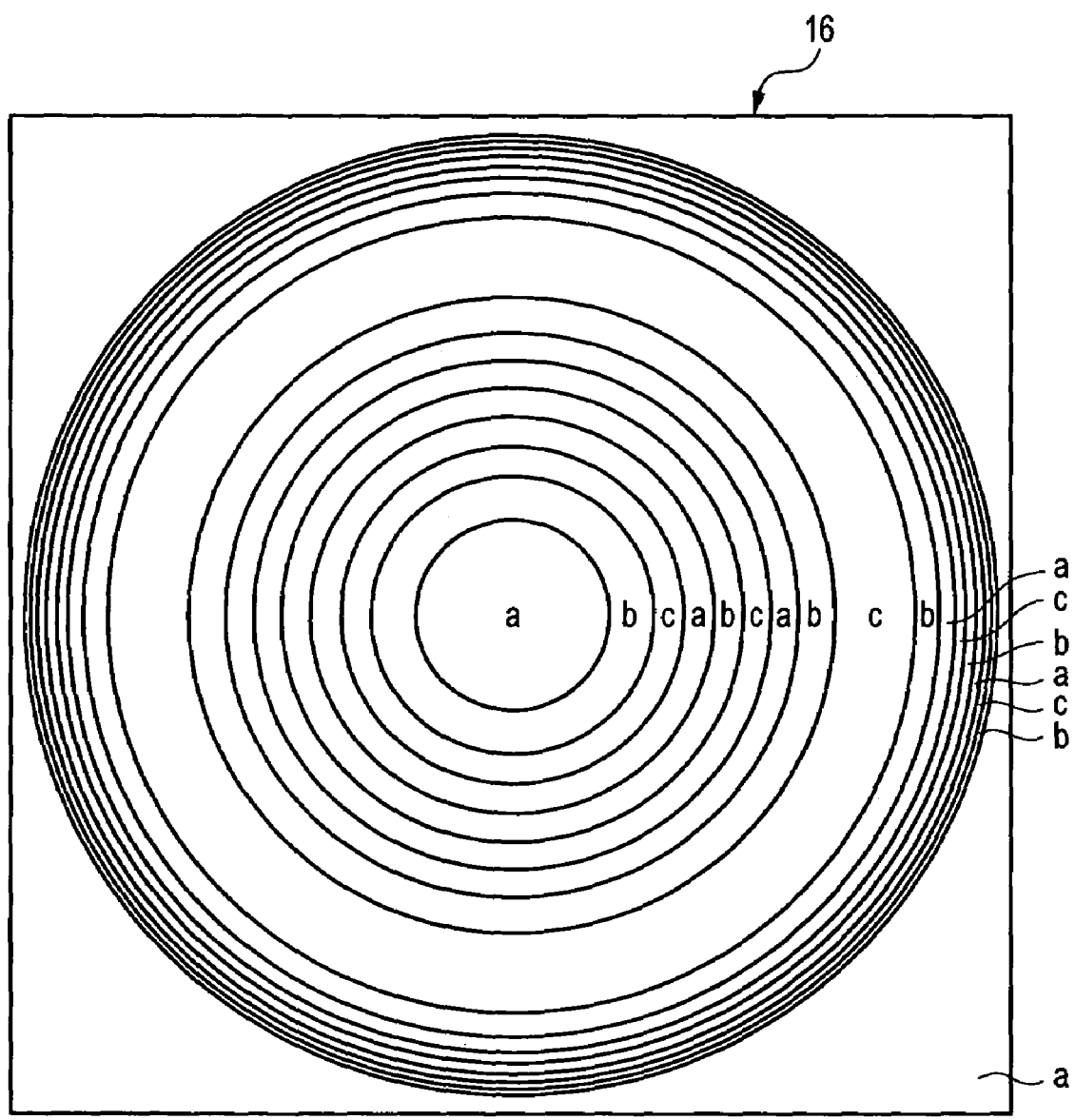
FIG. 4 is a plan view to show a second electrode section of the optical pickup apparatus according to the first embodiment of the invention.

FIG. 4 is a plan view to show the second electrode section 16 opposed to the first electrode section 12 with the liquid crystal 14 between. The second electrode section 16 is formed with an electrode pattern for correcting spherical aberration occurring on the optical disc of DVD. The first electrode section 12 is made up of a plurality of areas divided concentrically in response to the pattern of spherical aberration occurring on the DVD; the adjacent areas are insulated from each other. In FIG. 4, areas assigned the symbols a, b, or c are formed as electrode a, b, or c to which the same voltage is applied. The largest voltage is applied to the electrode c, the second largest voltage is applied to the electrode b, and the smallest voltage is applied to the electrode a.

The area of the second electrode section 16 is divided in response to the pattern of spherical aberration occurring on the DVD as similar to the first electrode section 12. Specifically, the pattern of spherical aberration occurring on the DVD is previously calculated using optical path tracking in an optimized optical system. The second electrode section 16 is divided based on the result of the optical path tracking, and voltage is applied to each electrode a, b, c of the second electrode section 16 so as to give a phase difference opposite to the calculated spherical aberration. The given phase difference and the spherical aberration occurring on the DVD cancel each other out. Thus, the second electrode section 16 corrects the detected signal so as not to cause spherical aberration to occur.

The liquid crystal device control circuit 20 is a control circuit for applying voltage separately to each electrode of the first electrode section 12 and each electrode of the second electrode section 16 of the aberration correction liquid crystal device 10. The liquid crystal device control circuit 20 has a DVD aberration correction signal generation section 21 for generating a voltage signal for correcting aberration occurring on a DVD based on the aberration signal r1 and a BRD aberration correction signal generation section 22 for generating a voltage signal for correcting aberration occurring on a BRD based on the aberration signal r1.

The liquid crystal device control circuit 20 receives a disc identification signal s indicating the type of disc to be recorded/played back at present and identifies the type of disc. Based on the disc identification signal s, the liquid crystal device control circuit 20 selects either of the DVD aberration correction signal generation section 21 and the BRD aberration correction signal generation section 22. The selected aberration correction signal generation section controls the potentials of the first electrode section 12 and the second electrode section 16 based on the aberration signal r1 received from the light receiver 8.

In recording/playing back the BRD, the liquid crystal device control circuit 20 applies voltage to each electrode of the first electrode section 12 based on the aberration signal r1 and on the other hand, keeps equal the potentials of all electrodes of the second electrode section 16. In contrast, at the DVD recording/playing back time, the liquid crystal device control circuit 20 applies voltage to each electrode of the second electrode section 16 based on the aberration signal r1 and further keeps equal the potentials of all electrodes of the first electrode section 12. To increase the aberration correction amount, namely, the phase difference, it is necessary to increase the potential difference between the first electrode section 12 and the second electrode section 16 and preferably, the potentials of all electrodes of the first electrode section 12 or the second electrode section 16 are kept at 0 V.

Figure 5:
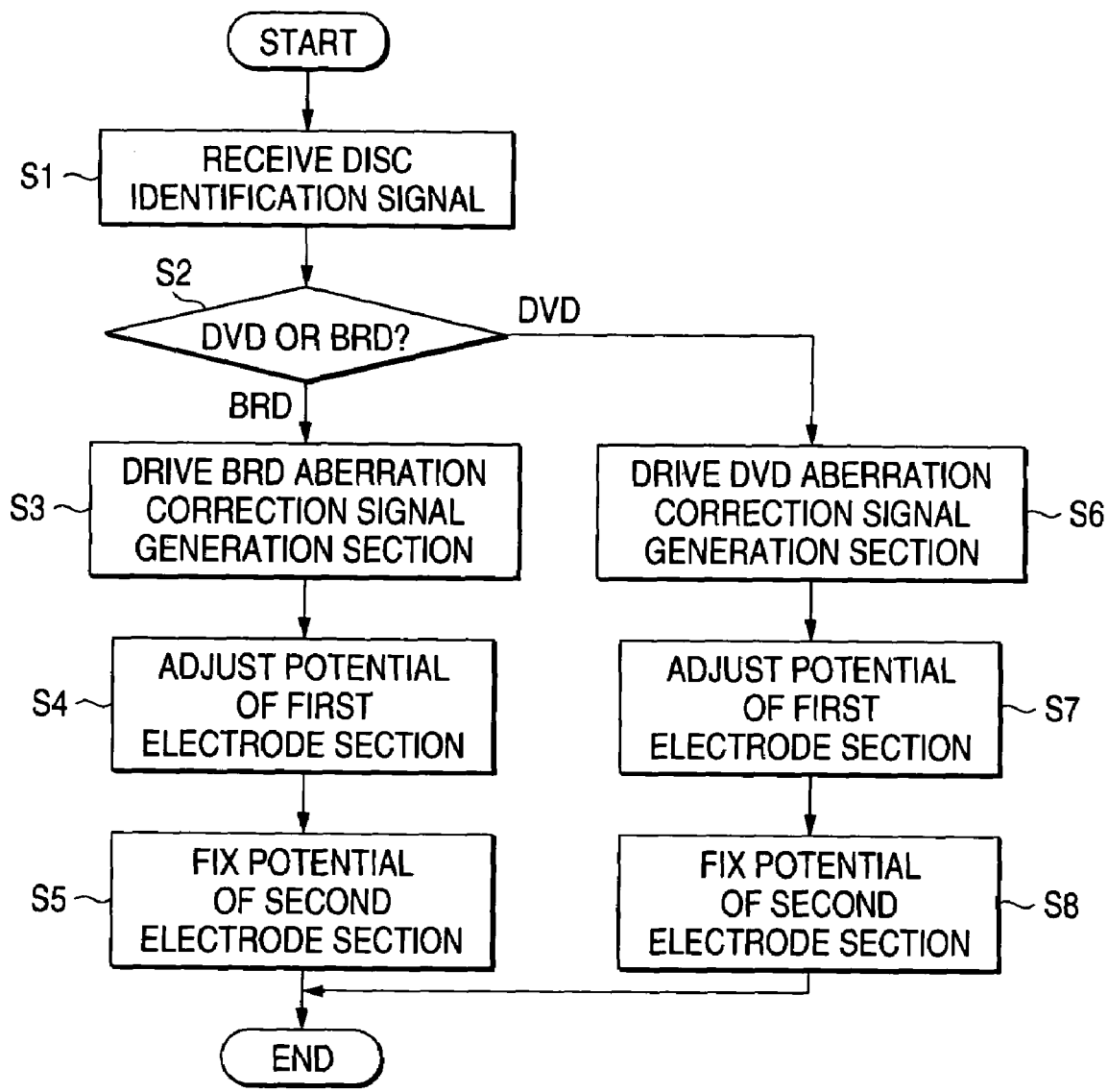
FIG. 5 is a flowchart to describe the operation of a liquid crystal device control circuit according to the first embodiment of the invention.

The operation of the optical pickup apparatus of the embodiment will be discussed hereinbelow with reference to FIG. 5. When the user inserts a DVD or a BRD into a predetermined position in a player (not shown) and presses a playback switch, a control section in the player determines whether the current disc to be played back is a DVD or a BRD, and outputs the disc identification signal s indicating the disc type to the liquid crystal device control circuit 20, which then receives the disc identification signal s (step S1). The optical pickup apparatus drives a spindle motor (not shown) to start playing back the disc. The laser light source 2 emits a laser of the wavelength responsive to the type of disc to be played back in accordance with the disc identification signal s for starting to read information on the disc surface.

The liquid crystal device control circuit 20 drives either the BRD aberration correction signal generation section 22 or the DVD aberration correction signal generation section 21 in accordance with the received disc identification signal s for correcting aberration. If the disc is a BRD, the BRD aberration correction signal generation section 22 is driven (step S3). The BRD aberration correction signal generation section 22 variably controls the potential of the first electrode section 12 of the aberration correction liquid crystal device 10 based on the aberration signal r1 received from the light receiver 8 (step S4). At the same time, the BRD aberration correction signal generation section 22 fixes the potential of the second electrode section 16 to a constant value (step S5). When the playback terminates, the liquid crystal device control circuit 20 terminates driving the BRD aberration correction signal generation section 22.

On the other hand, if the disc is a DVD, the DVD aberration correction signal generation section 21 is driven (step S6). The DVD aberration correction signal generation section 21 variably controls the potential of the second electrode section 16 of the aberration correction liquid crystal device 10 based on the aberration signal r1 received from the light receiver 8 (step S7). At the same time, the DVD aberration correction signal generation section 21 fixes the potential of the first electrode section 12 to a constant value (step S8). When the playback terminates, the liquid crystal device control circuit 20 terminates driving the DVD aberration correction signal generation section 21.

As described above, the aberration correction liquid crystal device 10 of the embodiment is placed on the optical axis of a laser beam emitted from the laser light source 2 in the optical pickup apparatus 1 which includes at least the laser light source 2 and the object lens 6 and can apply a laser beam to different types of optical discs. The aberration correction liquid crystal device 10 includes the first electrode section 12 placed on the side of the laser light source and having the first electrode pattern for correcting aberration concerning the first optical disc (BRD), the second electrode section 16 placed on the side of the optical disc and having the second electrode pattern for correcting aberration concerning the second optical disc (DVD) different from the first optical disc in type, and the liquid crystal 14 sandwiched between the first electrode section 12 and the second electrode section 16.

According to the embodiment, to correct aberration concerning the first optical disc, voltage is applied to the first electrode pattern of the first electrode section 12 and the second electrode pattern of the second electrode section 16 is placed in equipotential state, whereby the aberration is corrected. To correct aberration concerning the second optical disc, voltage is applied to the second electrode pattern of the second electrode section 16 and the first electrode pattern of the first electrode section 12 is placed in equipotential state, whereby the aberration is corrected. In the configuration, one aberration correction liquid crystal device can be used to correct aberrations occurring when different types of discs are played back, and if it is not necessary to simultaneously correct different aberrations occurring on one disc, the optical pickup apparatus can be miniaturized. Particularly, if it is feared that the presence of one aberration (for example, spherical aberration) among aberrations occurring on discs may remarkably degrade the performance of the optical pickup apparatus as compared with another type of aberration, the aberration correction liquid crystal device in the embodiment makes it possible to drastically enhance the performance of the optical pickup apparatus.

In the embodiment, to variably control one electrode section potential, the other electrode section potential is fixed to a constant value, so that the potential difference between the electrodes can be kept at the maximum for largely changing the refractive index of the liquid crystal 14 and thus it is made possible to make effective aberration correction.

As for spherical aberration correction when a DVD is used in DVD-BRD compatibility, the transparent protection layer of BRD is 0.1 mm thick and that of DVD is 0.6 mm thick. To record/play back both types of discs with one optical pickup apparatus, it is necessary to make spherical aberration correction on the BRD so as always to compensate for a thickness of 0.5 mm, and the aberration correcting direction is always determined. Thus, in the spherical aberration correction to provide DVD-BRD compatibility, the need for switching the voltages applied to the remaining electrodes between those when the transparent protection layer is thick and those when the transparent protection layer is thin relative to the reference electrode voltage as in the related art is eliminated and the voltages are always constant. Thus, in DVD-BRD compatibility, the voltage of either electrode a or c in FIG. 4 can always be fixed to a constant value. Accordingly, the voltages to be applied can be fixed only to either (electrode a)<(electrode b)<(electrode c) or (electrode c)<(electrode b)< (electrode a). Therefore, it is not necessary to provide an applied voltage switch circuit and it is made possible to miniaturize circuitry and reduce costs.

In the embodiment, to correct spherical aberration, the electrodes shown in FIGS. 3 and 4 are used, but the invention is not limited to them. The electrodes may be replaced with such electrodes for correcting various aberrations occurring in the optical system of the pickup apparatus, so that the aberrations are corrected. For example, it is also possible to measure the tilt angle of a disc and make correction corresponding to the tilt angle.

In the embodiment, the optical pickup of BRD and DVD compatible type has been described, but the invention can also be applied to optical pickups of compatible type between different types of optical discs such as CD and BRD or CD and DVD.

In the embodiment, the polarization beam splitter is used to split a laser beam, but the invention is not limited to it. A non-polarization beam splitter, a half mirror, etc., may be used. In this case, the quarter wavelength plate need not be provided.

Second Embodiment

A second embodiment of an optical pickup apparatus 50 according to the invention will be discussed hereinbelow.

Figure 6:
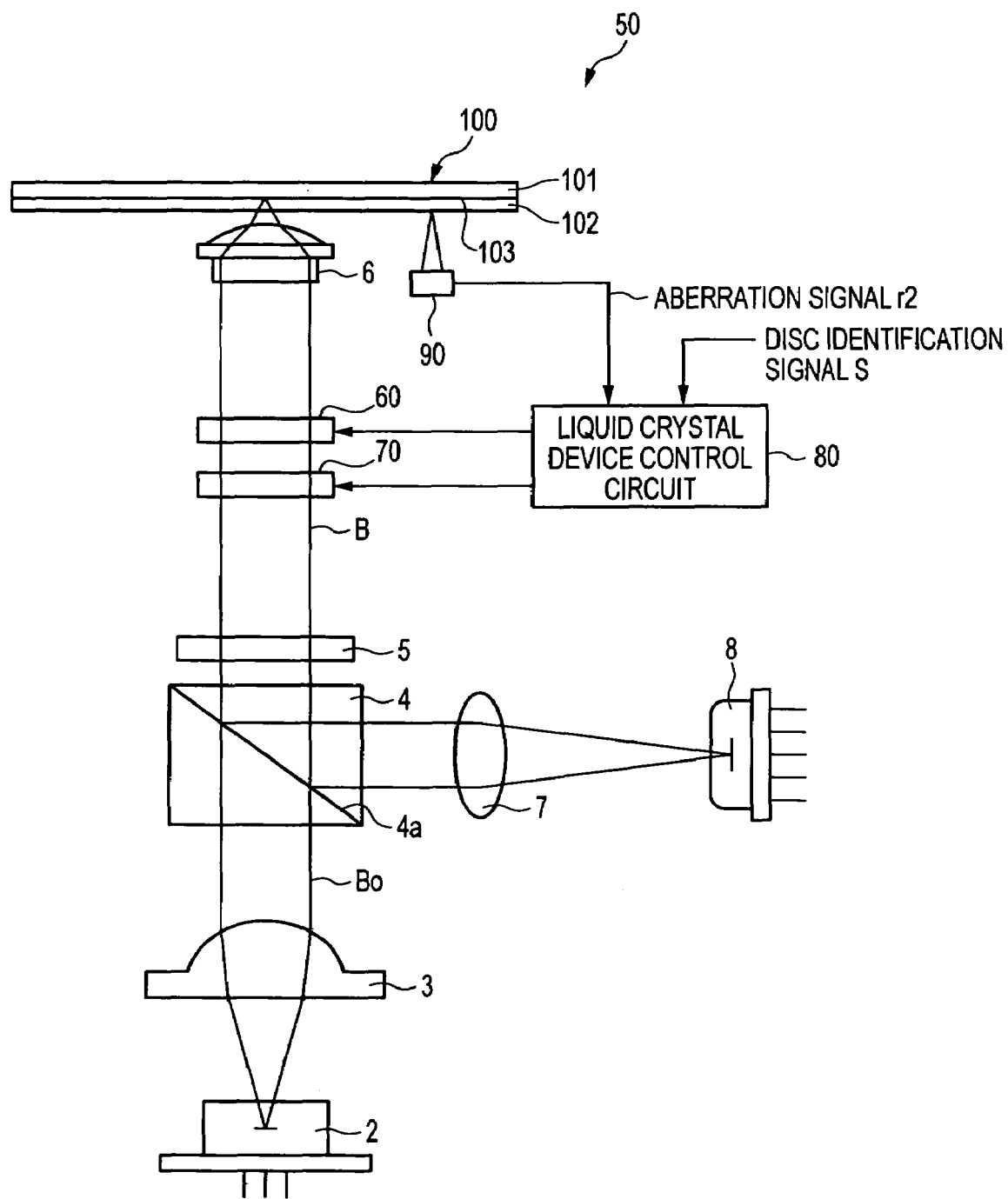
FIG. 6 is a drawing to show the optical layout of an optical pickup apparatus according to a second embodiment of the invention.

FIG. 6 is a drawing to show the optical layout of the optical pickup apparatus 50 according to the second embodiment. Components identical with those of the optical pickup apparatus 1 of the first embodiment will not be discussed again. The optical pickup apparatus 50 of the embodiment is an optical pickup of DVD-BRD compatible type capable of recording/playing back DVD and BRD standard discs. The optical pickup apparatus 50 includes a laser light source 2, a collimator lens 3, a polarization beam splitter 4, a quarter wavelength plate 5, an object lens 6, a focus lens 7, a light receiver 8, and two aberration correction liquid crystal devices 60 and 70.

Figure 7:
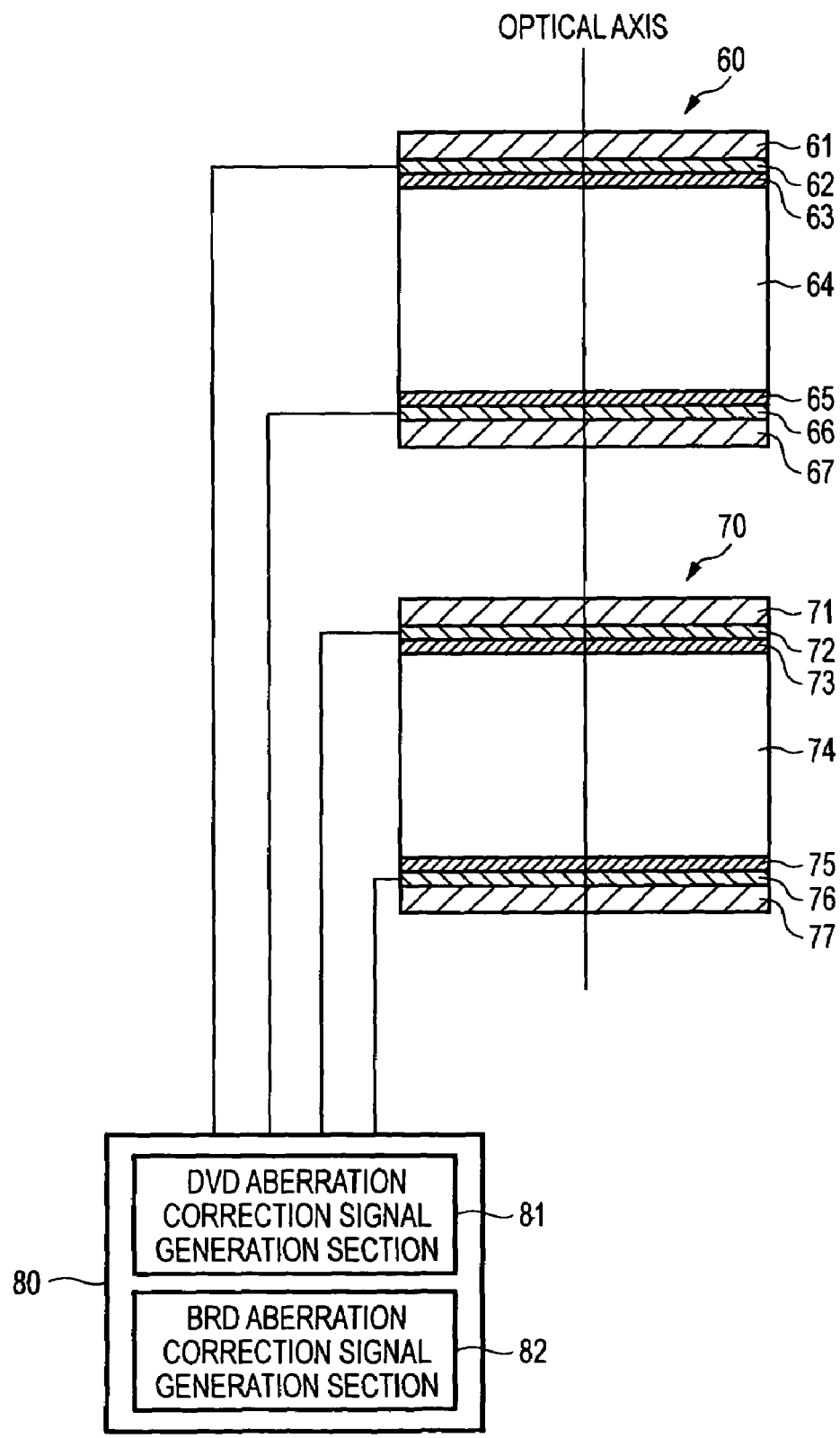
FIG. 7 is a sectional view to show aberration correction liquid crystal devices.

FIG. 7 is a sectional view to show the aberration correction liquid crystal devices 60 and 70. The aberration correction liquid crystal devices 60 and 70 are placed on the optical axis between the quarter wavelength plate 5 and the object lens 6. In the DVD and BRD, the optical axis is inclined in response to such as the disc shape of warpage, and wave front aberration occurs. As the wave front aberration responsive to the disc shape of warpage, the wave front aberrations occur in the tangential direction and the radial direction at the same time. The aberration correction liquid crystal device 60 is a device for correcting the wave front aberrations in the tangential direction, and the aberration correction liquid crystal device 70 is a device for correcting the wave front aberrations in the radial direction.

The aberration correction liquid crystal device 60 is made up of liquid crystal 64, orientation films 63 and 65, a first electrode section 62, a second electrode section 66, a first substrate 61, and a second substrate 67. On the other hand, the aberration correction liquid crystal device 70 is made up of liquid crystal 74, orientation films 73 and 75, a third electrode section 72, a fourth electrode section 76, a first substrate 71, and a second substrate 77. The basic configuration of each of the aberration correction liquid crystal devices 60 and 70 is the same as that of the aberration correction liquid crystal device 10 in the first embodiment.

Figure 8:
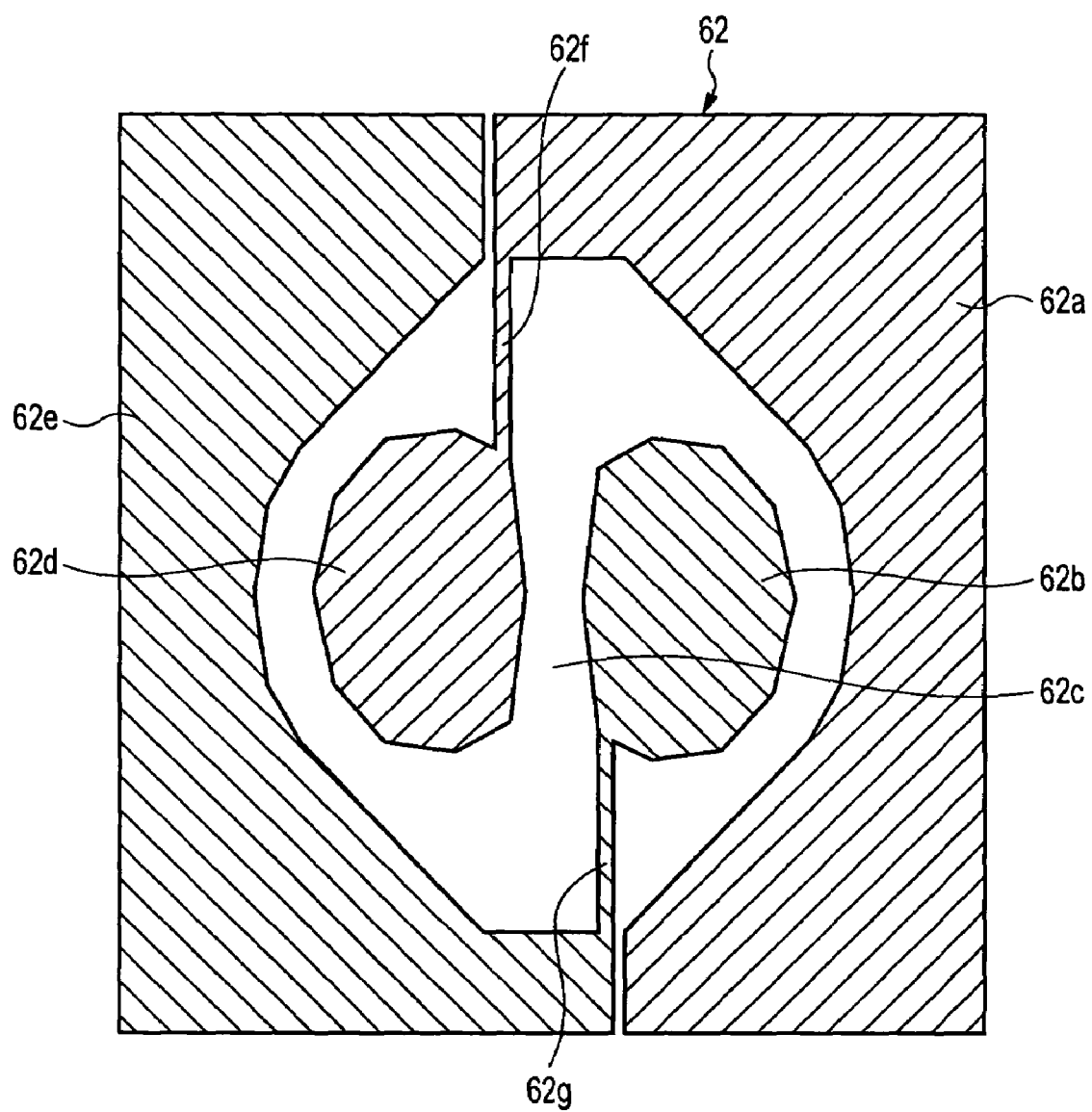
FIG. 8 is a plan view to show a first electrode section of the optical pickup apparatus according to the second embodiment of the invention.

FIG. 8 is a plan view to show the first electrode section 62 of the aberration correction liquid crystal device 60. The first electrode section 62 is an electrode section for correcting wave front aberration in the tangential direction occurring on an optical disc of BRD. The first electrode section 62 is divided into five areas 62a to 62e in response to the wave front aberration in the tangential direction. The areas 62a and 62d and the areas 62b and 62e are connected by connection lines 62f and 62g respectively and are placed in equipotential state.

The area of the first electrode section 62 is divided in response to the pattern of wave front aberration in the tangential direction occurring on the BRD. Specifically, the pattern of wave front aberration occurring on the BRD is previously calculated using optical path tracking in an optimized optical system. The first electrode section 62 is divided corresponding to the pattern of wave front aberration based on the result of the optical path tracking, and voltage is applied to each electrode of the first electrode section 62 so as to give a phase difference opposite to the calculated wave front aberration. The given phase difference and the wave front aberration in the tangential direction occurring on the BRD cancel each other out. Thus, the first electrode section 62 corrects the detected signal so as not to cause wave front aberration to occur.

Figure 9:
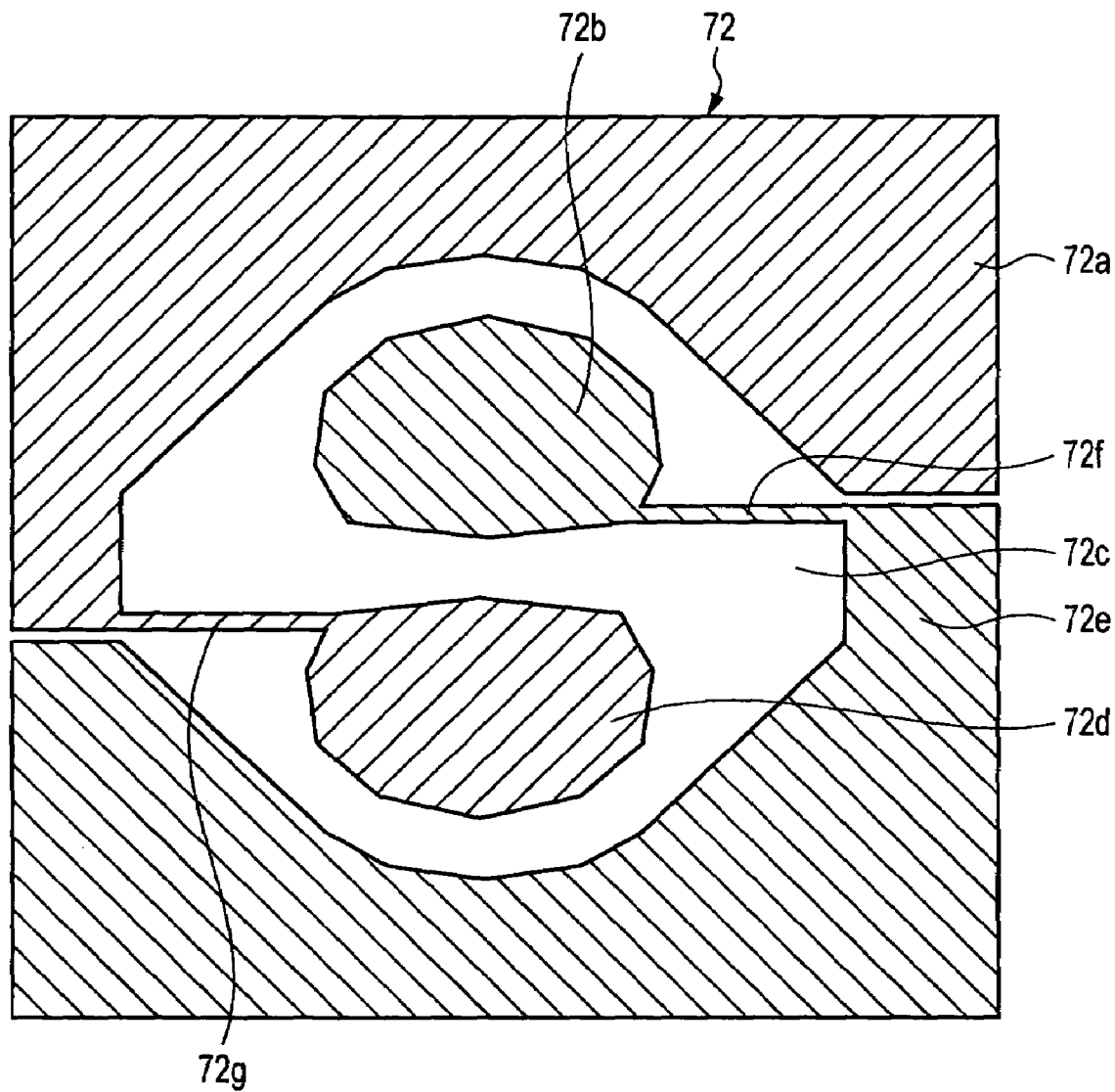
FIG. 9 is a plan view to show a third electrode section of the optical pickup apparatus according to the second embodiment of the invention.

FIG. 9 is a plan view to show the third electrode section 72 of the aberration correction liquid crystal device 70. The third electrode section 72 is an electrode section for correcting wave front aberration in the radial direction occurring on an optical disc of BRD. The third electrode section 72 is divided into five areas 72a to 72e in response to the wave front aberration in the radial direction. The areas 72a and 72d and the areas 72b and 72e are connected by connection lines 72f and 72g respectively and are placed in equipotential state.

The area of the third electrode section 72 is divided in response to the pattern of wave front aberration in the radial direction occurring on the BRD. Specifically, the pattern of wave front aberration occurring on the BRD is previously calculated using optical path tracking in an optimized optical system. The third electrode section 72 is divided corresponding to the pattern of wave front aberration based on the result of the optical path tracking, and voltage is applied to each electrode of the third electrode section 72 so as to give a phase difference opposite to the calculated wave front aberration. The given phase difference and the wave front aberration in the radial direction occurring on the BRD cancel each other out. Thus, the third electrode section 72 corrects the detected signal so as not to cause wave front aberration to occur.

The second electrode section 66 opposed to the first electrode section 62 and the fourth electrode section 76 opposed to the third electrode section 72 are formed with electrode patterns for correcting wave front aberrations in the tangential direction and the radial direction occurring on the DVD. That is, the aberration correction liquid crystal device 60 functions as a device for correcting the wave front aberration in the tangential direction on BRD and DVD, and the aberration correction liquid crystal device 70 functions as a device for correcting the wave front aberration in the radial direction on BRD and DVD.

The liquid crystal device control circuit 80 is a control circuit for applying voltage separately to each area of the first electrode section 62 and each area of the second electrode section 66 of the aberration correction liquid crystal device 60 and each area of the third electrode section 72 and each area of the fourth electrode section 76 of the aberration correction liquid crystal device 70. The liquid crystal device control circuit 80 has a DVD aberration correction signal generation section 81 for generating a voltage signal for correcting aberration occurring on a DVD based on an aberration signal r2 obtained from a tilt angle detector 90 opposed to the disc side in the proximity of the outer peripheral portion of the disc to be played back and a BRD aberration correction signal generation section 82 for generating a voltage signal for correcting aberration occurring on a BRD based on the aberration signal r2.

The liquid crystal device control circuit 80 receives a disc identification signal s indicating the type of disc to be recorded/played back at present and identifies the type of disc. Based on the disc identification signal s, the liquid crystal device control circuit 80 selects either of the DVD aberration correction signal generation section 81 and the BRD aberration correction signal generation section 82. The selected aberration correction signal generation section controls the potentials of the first electrode section 62, the second electrode section 66, the third electrode section 72, and the fourth electrode section 76 based on the aberration signal r2 received from the tilt angle detector 90.

Here, at the BRD recording/playing back time, the liquid crystal device control circuit 80 applies voltage to each area of the first electrode section 62 based on the aberration signal r2, keeps equal the potentials of all areas of the second electrode section 66, each area of the third electrode section 72 based on the aberration signal r2, and keeps equal the potentials of all areas of the fourth electrode section 76. In contrast, at the DVD recording/playing back time, the liquid crystal device control circuit 80 applies voltage to each area of the second electrode section 66 based on the aberration signal r2, keeps equal the potentials of all areas of the first electrode section 62, each area of the fourth electrode section 76 based on the aberration signal r2, and keeps equal the potentials of all areas of the third electrode section 72. To increase the aberration correction amount, namely, the phase difference, it is necessary to increase the potential difference between the first electrode section 62 and the second electrode section 66 or the potential difference between the third electrode section 72 and the fourth electrode section 76 and preferably, the potentials of all areas of each electrode section placed in equaipotential state are kept at 0 V.

According to the embodiment, to correct different types of aberrations, the two aberration correction liquid crystal devices 60 and 70 are provided. In the embodiment, only one electrode section of each aberration correction liquid crystal device is variably controlled and the other is fixed to a constant value. Therefore, the potential difference between the electrodes can be kept at the maximum for largely changing the refractive index of the liquid crystal 64, 74 and thus it is made possible to make effective aberration correction.

In the embodiment, to correct wave front aberrations in the tangential direction and the radial direction caused by the disc shape, the electrodes shown in FIGS. 8 and 9 are used, but the invention is not limited to them. The electrodes may be replaced with such electrodes for correcting various aberrations occurring in the optical system of the pickup apparatus, so that the aberrations are corrected.

In the embodiment, the polarization beam splitter is used to split a laser beam, but the invention is not limited to it. A non-polarization beam splitter, a half mirror, etc., may be used. In this case, the quarter wavelength plate need not be provided.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. An aberration correction liquid crystal device to be mounted in an optical pickup apparatus for applying a laser beam emitted from a laser light source onto different types of optical discs, and to be disposed on an optical axis of the laser beam, the device comprising:
a first electrode section to be placed on the side of the laser light source and having a first electrode pattern for correcting aberration concerning a first optical disc, the first electrode pattern being defined by a first group of electrodes;
a second electrode section to be placed on the side of the optical disc and having a second electrode pattern for correcting aberration concerning a second optical disc different from the first optical disc in type, the second electrode pattern being defined by a second group of electrodes; and
a liquid crystal being sandwiched between the first and the second electrode sections,
wherein in correcting the aberration concerning the first optical disc, the first electrode pattern is applied with a voltage and all of the second group of electrodes are placed in equipotential state, and
wherein in correcting the aberration concerning the second optical disc, the second electrode pattern is applied with a voltage and all of the first group of electrodes are placed in equipotential state.

2. The device as claimed in claim 1, wherein the first electrode pattern is specifically configured for correcting aberration concerning only the first optical disc, and wherein the second electrode pattern is specifically configured for correcting aberration concerning only the second optical disc.

3. The device as claimed in claim 1, wherein the equipotential state is at a voltage level of 0 volts.

4. The device as claimed in claim 1, wherein the first group of electrodes are concentrically arranged with one another.

5. The device as claimed in claim 1, wherein the second group of electrodes are concentrically arranged with one another.

6. An optical pickup apparatus that read or write information from or onto different types of optical discs, the optical pickup apparatus comprising:
a laser light source configured to emit a laser beam;
an object lens configured to converge the laser beam on an optical disc; and
an aberration correction liquid crystal device configured to be disposed between the laser light source and the object lens, and on an optical axis of the laser beam,
wherein the aberration correction liquid crystal device comprises:
a first electrode section to be placed on the side of the laser light source and having a first electrode pattern for correcting aberration concerning a first optical disc, the first electrode pattern being defined by a first group of electrodes;
a second electrode section to be placed on the side of the optical disc and having a second electrode pattern for correcting aberration concerning a second optical disc different from the first optical disc in type, the second electrode pattern being defined by a second group of electrodes; and
a liquid crystal being sandwiched between the first and the second electrode sections,
wherein in correcting the aberration concerning the first optical disc, the first electrode pattern is applied with a voltage and all of the second group of electrodes are placed in equipotential state, and
wherein in correcting the aberration concerning the second optical disc, the second electrode pattern is applied with a voltage and all of the first group of electrodes are placed in equipotential state.

7. The optical pickup apparatus as claimed in claim 6, wherein the first electrode pattern is specifically configured for correcting aberration concerning only the first optical disc, and wherein the second electrode pattern is specifically configured for correcting aberration concerning only the second optical disc.

8. The optical pickup apparatus as claimed in claim 6, wherein the equipotential state is at a voltage level of 0 volts.

9. The optical pickup apparatus as claimed in claim 6, wherein the first group of electrodes are concentrically arranged with one another.

10. The optical pickup apparatus as claimed in claim 6, wherein the second group of electrodes are concentrically arranged with one another.

* * * * *